United States Patent
Kamijo et al.

(10) Patent No.: US 7,889,294 B2
(45) Date of Patent: Feb. 15, 2011

(54) ELECTRO-OPTICAL DEVICE WITH TRANSMISSIVE AND REFLECTION DISPLAY REGIONS WHERE THE REFLECTION DISPLAY REGION HAS A SCATTER-REFLECTION AND MIRROR-REFLECTION REGION

(75) Inventors: Kimitaka Kamijo, Shiojiri (JP); Tomoyuki Nakano, Azumino (JP); Keiji Takizawa, Toyoshina (JP); Tatsuya Kato, Matsumoto (JP)

(73) Assignee: Seiko Epson Corporation (JP)

( * ) Notice: Subject to any disclaimer, the term of this patent is extended or adjusted under 35 U.S.C. 154(b) by 440 days.

(21) Appl. No.: 11/351,180

(22) Filed: Feb. 9, 2006

(65) Prior Publication Data

US 2006/0197895 A1    Sep. 7, 2006

(30) Foreign Application Priority Data

Mar. 2, 2005    (JP)    ............................. 2005-057116

(51) Int. Cl.
G02F 1/1335    (2006.01)

(52) U.S. Cl. ...................................... 349/114; 349/113

(58) Field of Classification Search ......... 349/106–111, 349/113–115
See application file for complete search history.

(56) References Cited

U.S. PATENT DOCUMENTS

| | | | | |
|---|---|---|---|---|
| 6,008,871 A | * | 12/1999 | Okumura | ...................... 349/61 |
| 6,081,354 A | * | 6/2000 | Gambogi et al. | ............... 359/15 |
| 6,195,140 B1 | * | 2/2001 | Kubo et al. | .................... 349/44 |
| 6,215,538 B1 | | 4/2001 | Narutaki et al. | |
| 6,624,860 B1 | | 9/2003 | Narutaki et al. | |
| 6,757,038 B2 | | 6/2004 | Itoh et al. | |
| 6,906,765 B2 | | 6/2005 | Narutaki et al. | |
| 7,050,132 B2 | * | 5/2006 | Okamoto et al. | ............ 349/114 |
| 7,072,011 B2 | | 7/2006 | Maeda | |
| 7,119,861 B2 | | 10/2006 | Tsuchiya et al. | |
| 7,250,998 B2 | | 7/2007 | Narutaki et al. | |
| 7,298,439 B2 | * | 11/2007 | Ozawa et al. | ................ 349/114 |
| 2003/0016459 A1 | * | 1/2003 | Takizawa et al. | ............. 359/885 |
| 2003/0025977 A1 | * | 2/2003 | Takizawa et al. | ............. 359/245 |
| 2003/0133059 A1 | | 7/2003 | Wei et al. | |
| 2004/0061817 A1 | * | 4/2004 | Maeda | ........................ 349/113 |
| 2004/0252262 A1 | | 12/2004 | Park | |
| 2005/0024559 A1 | * | 2/2005 | Okumura | ..................... 349/114 |
| 2005/0083453 A1 | * | 4/2005 | Nakano et al. | ............... 349/106 |

(Continued)

FOREIGN PATENT DOCUMENTS

CN        1447155 A    10/2003

(Continued)

Primary Examiner—David Nelms
Assistant Examiner—Jessica M Merlin
(74) Attorney, Agent, or Firm—Harness, Dickey & Pierce, P.L.C.

(57) ABSTRACT

An electro-optical device includes a pair of substrates that hold an electro-optical material therebetween and include a plurality of pixels each having a reflective display region and a transmissive display region; a reflective film that is provided in the reflective display region and has a flat surface in a portion of the reflective display region adjacent to the transmissive display region, the portion of the reflective display region serving as a first mirror-reflection region; and colored layers each of which is formed in only the first mirror-reflection region and the transmissive display region.

12 Claims, 7 Drawing Sheets

U.S. PATENT DOCUMENTS

2007/0247570 A1 10/2007 Narutaki et al.
2008/0002085 A1 1/2008 Narutaki et al.

FOREIGN PATENT DOCUMENTS

| JP | 2000-111902 | 4/2000 |
| JP | 2002-055333 | 2/2002 |
| JP | 2003-344847 | 12/2003 |
| JP | 2004-037494 | 2/2004 |
| JP | 2004-054129 | 2/2004 |
| JP | 2004054129 A * | 2/2004 |
| JP | 2004-077544 | 3/2004 |
| JP | 2004-093670 | 3/2004 |
| JP | 2004-093781 | 3/2004 |
| JP | 2004-109777 | 4/2004 |
| JP | 2005-181604 | 7/2005 |

* cited by examiner

ELECTRO-OPTICAL DEVICE WITH TRANSMISSIVE AND REFLECTION DISPLAY REGIONS WHERE THE REFLECTION DISPLAY REGION HAS A SCATTER-REFLECTION AND MIRROR-REFLECTION REGION

RELATED APPLICATIONS

This application claims priority to Japanese Patent Application No. 2005-057116 filed Mar. 2, 2005 which is hereby expressly incorporated by reference herein in its entirety.

BACKGROUND

1. Technical Field

The present invention relates to an electro-optical device substrate, to an electro-optical device, and to an electronic apparatus using them, such as a personal computer or a cellular phone.

2. Related Art

In recent years, liquid crystal display devices have been used as display devices of electronic apparatuses, such as personal computers and cellular phones. In addition, a transflective liquid crystal display device having a transmissive display region for transmitting light and a reflective display region for reflecting light has been known as an example of the liquid crystal display device. The liquid crystal display device has a problem in that dark reflective display occurs in the reflective display region requiring a high-transmittance colored layer as compared with the transmissive display region.

In order to solve the problem, the following technique has been disclosed: a color filter is provided in only the transmissive display region, which enables a bright black-and-white image to be displayed during reflective display and a color image having sufficient color reproducibility and brightness to be displayed during transmissive display (for example, see JP-A-2004-093670 (paragraph [0021] and FIG. 1).

However, the technique disclosed in JP-A-2004-093670 has a problem in that, although bright reflective display can be obtained, the colored layer to be provided in only the transmissive display region may protrudes to the reflective display region due to, for example, a manufacturing error, resulting in thin reflective color display.

In contrast, when the amount of the colored layer to be provided in the transmissive display region is reduced to prevent the protrusion, an insufficient amount of the colored layer makes it difficult to display desired color display in the transmissive display region.

SUMMARY

An advantage of some aspects of the invention is that it provides an electro-optical device substrate capable of improving the quality of monochromatic display in a reflective display region while ensuring the quality of color display in a transmissive display region, an electro-optical device, and an electronic apparatus including the electro-optical device.

According to an aspect of the invention, an electro-optical device includes a pair of substrates that hold an electro-optical material therebetween and include a plurality of pixels each having a reflective display region and a transmissive display region; a reflective film that is provided in the reflective display region and has a flat surface in a portion of the reflective display region adjacent to the transmissive display region, the portion of the reflective display region serving as a first mirror-reflection region; and colored layers each of which is formed in only the first mirror-reflection region and the transmissive display region.

Here, the 'pixel' includes a plurality of sub-pixels.

According to this structure, the electro-optical device includes a pair of substrates that hold an electro-optical material therebetween and include a plurality of pixels each having a reflective display region and a transmissive display region; a reflective film that is provided in the reflective display region and has a flat surface in a portion of the reflective display region adjacent to the transmissive display region, the portion of the reflective display region serving as a first mirror-reflection region; and colored layers each of which is formed in only the first mirror-reflection region and the transmissive display region. Therefore, even when the colored layer to be provided in only the transmissive display region protrudes toward the first mirror-reflection region of the reflective display region due to, for example, a manufacturing error, it is possible to prevent the colored layer from protruding to the reflective display region having an uneven surface. As a result, this structure makes it possible to prevent thin reflective display, that is, thin monochromatic display, and thus to improve the quality of monochromatic display in the reflective display region, while ensuring the quality of color display by the colored layer provided in the transmissive display region. In addition, when light is incident on the first mirror-reflection region, the light can be mirror-reflected therefrom without dispersion. Therefore, it is possible to prevent the colored layer protruding to only the first mirror-reflection region from contributing to display. Further, the reflective film for scattering light is formed in a region other than the first mirror-reflection region in the reflective display region so as to extend to the first mirror-reflection region. Therefore, the reflective film can be provided in the first mirror-reflection region and the region other than the first mirror-reflection region in the reflective display region at the same time, without providing an additional member between the first mirror-reflection region and the region other than the first mirror-reflection region in the reflective display region, which makes it possible to decrease the number of manufacturing processes and to reduce manufacturing costs.

In the above-mentioned structure, it is preferable that the reflective film provided in a region other than the first mirror-reflection region in the reflective display region have an uneven surface. According to this structure, since the reflective film provided in the region other than the first mirror-reflection region in the reflective display region have an uneven surface, it is possible to allow light scattered by the uneven surface to contribute to reflective display. In addition, incident light is mirror-reflected from the reflective film provided in the first mirror-reflection region of the reflective display region, which makes it possible to prevent the reflected light from contributing to display.

Further, in the above-mentioned structure, it is preferable that the reflective film provided in the first mirror-reflection region be formed of a different material from that forming the reflective film provided in the region other than the first mirror-reflection region in the reflective display region. According to this structure, the reflective film in the first mirror-reflection region and the reflective film in the region other than the first mirror-reflection region in the reflective display region are formed of different materials. In this case, since the reflective film in the first mirror-reflection region is simultaneously formed with metal wiring lines, it is possible to manufacture an electro-optical device without an increase in manufacturing costs. In addition, for example, the reflective film in the region other than the first mirror-reflection region in the reflective display region can be formed of a metallic material, and the reflective film in the first mirror-reflection region can be formed of a material (for example, a white pigment) other than the metallic material.

Further, in the above-mentioned structure, it is preferable that a pixel have a flat reflective film in the vicinity of a boundary between the reflective display region thereof and the transmissive display region of another pixel adjacent to the reflective display region thereof, so that a second mirror-reflection region is provided therein. According to this structure, a pixel having a flat reflective film in the vicinity of the boundary between the reflective display region thereof and the transmissive display region of another pixel adjacent to the reflective display region thereof, and a second mirror-reflection region is provided therein. Therefore, it is possible to prevent a colored layer for performing color display from protruding to a region other than the reflective display region via the second mirror-reflection region, and thus to improve the quality of reflective display. In addition, for example, the reflective film in the first mirror-reflection region can be simultaneously formed with the reflective film in the second mirror-reflection region, resulting in a reduction in manufacturing costs.

Moreover, in the above-mentioned structure, the electro-optical device further includes a first light shielding layer that is provided between the transmissive display region of a pixel and the reflective display region of another pixel adjacent to the transmissive display region of the pixel. According to this structure, the first light shielding layer is provided between the transmissive display region of a pixel and the reflective display region of another pixel adjacent to the transmissive display region of the pixel. Therefore, even when the colored layer for performing color display protrudes from the transmissive display region to the reflective display region, it is possible to shield light by using the first light shielding layer, resulting in an improvement in display quality.

Further, in the above-mentioned structure, it is preferable that the colored layers have a plurality of colors, and that the first light shielding layer be formed by laminating the colored layers having different colors. According to this structure, since the colored layers have a plurality of colors and the first light shielding layer is formed by laminating the colored layers having different colors, it is possible to use the colored layers for performing color display to form the first light shielding layer. As a result, it is possible to reduce manufacturing costs as compared with the case in which the first light shielding layer is formed of members other than the colored layers.

Furthermore, in the above-mentioned structure, it is preferable that the reflective film be provided on one of the pair of substrates and that a second light shielding layer be provided in a region of the other substrate of the pair of substrates corresponding to the first mirror-reflection region. According to this structure, the reflective film is provided on one of the pair of substrates, and the second light shielding layer is provided in the region of the other substrate of the pair of substrates corresponding to the first mirror-reflection region. Therefore, even when the colored layer to be provided in the transmissive display region protrudes toward the first mirror-reflection region due to, for example, a manufacturing error, the colored layer overlaps the reflective film in the first mirror-reflection region so as not to protrude to the region other than the first mirror-reflection region in the reflective display region, so that it is hidden by the second light shielding portion, as viewed from the light transmission side, which makes it possible to improve the quality of monochromatic display in the reflective display region.

Moreover, in the above-mentioned structure, it is preferable that a side of the first mirror-reflection region adjacent to the transmissive display region have a linear shape. According to this structure, since the side of the first mirror-reflection region adjacent to the transmissive display region has a linear shape, it is possible to shorten the length of the side of the first mirror-reflection region adjacent to the transmissive display region as compared with the case in which the first mirror-reflection region is provided in a curved line, which results in a reduction in the area of the first mirror-reflection region. Thus, it is possible to prevent a reduction in the brightness of reflective display and to improve the quality of monochromatic display in the reflective display region.

Further, in the above-mentioned structure, it is preferable that the reflective film be provided in an island shape in the pixel or the transmissive display region be an aperture provided in the reflective film. According to this structure, since the reflective film is provided in an island shape in the pixel or the transmissive display region is an aperture provided in the reflective film, it is possible to prevent the deterioration of display quality depending on the deviation of the forming positions of the transmissive display region and the reflective display region.

Furthermore, in the above-mentioned structure, it is preferable that the first mirror-reflection region have a width of 1 to 10 μm. Here, the width of the first mirror-reflection region means a distance between the transmissive display region and the region other than the first mirror-reflection region in the reflective display region. According to this structure, since the first mirror-reflection region has a width of 1 to 10 μm, it is possible to reliably prevent the colored layer from protruding to the region other than the first mirror-reflection region in the reflective display region through the first mirror-reflection region and thus to prevent reflective display from being excessively dark by the first mirror-reflection region.

Moreover, in the above-mentioned structure, the electro-optical device further includes an underlayer that has an uneven surface and is formed between the substrate and the reflective film in a region other than the first mirror-reflection region. According to this structure, since the underlayer having an uneven surface for scattering light is formed between the substrate and the reflective film in the region other than the first mirror-reflection region, it is possible to allow scattered light to contribute to reflective display and to form a flat reflective film not contributing to reflective display in the first mirror-reflection region where the underlayer is not formed. In this case, even when the colored layer protrudes to the first mirror-reflection region, thin reflective color display does not occur because mirror reflection occurs in the first mirror-reflection region. In addition, the surface of the substrate is used in order to planarize the surface of the reflective film in the first mirror-reflection region, which makes it possible to more reliably planarize the surface of the reflective film.

Further, in the above-mentioned structure, it is preferable that an underlayer be provided between the substrate and the reflective film, and that the underlayer have a flat surface in the first mirror-reflection region and an uneven surface in a region other than the first mirror-reflection region in the reflective display region. According to this structure, the underlayer is provided between the substrate and the reflective film, and the underlayer has a flat surface in the first mirror-reflection region and an uneven surface in the region other than the first mirror-reflection region in the reflective display region. In this case, a height from the substrate to the reflective film in the first mirror-reflection region becomes large as compared with the case in which the underlayer is not provided in the first mirror-reflection region. As a result, it is possible to reduce the amount of a colored layer forming material flowing into the first mirror-reflection region from the transmissive display region during manufacture, and thus to more reliably prevent the colored layer from protruding toward the region other than the first mirror-reflection region in the reflective display region via the first mirror-reflection region, resulting in an improvement in the quality of monochromatic display in reflective display. In addition, it is possible to form a flat reflective film not contributing to reflective display in the first mirror-reflection region by providing an underlayer having no unevenness in the first mirror-reflection region.

Furthermore, in the above-mentioned structure, it is preferable that an underlayer having an uneven surface be provided between the substrate and the reflective film, and that a planarizing film for planarizing the uneven surface of the underlayer be formed in the first mirror-reflection region between the underlayer and the reflective film. According to this structure, the underlayer having an uneven surface is provided between the substrate and the reflective film, and the planarizing film for planarizing the uneven surface of the underlayer is formed in the first mirror-reflection region between the underlayer and the reflective film. Therefore, even when it is difficult to selectively form uneven portions on the underlayer in the region other than the first mirror-reflection region with high accuracy, it is possible to form a flat reflective film not contributing to reflective display in the first mirror-reflection region by only forming the planarizing film on the underlayer having an uneven surface in the first mirror-reflection region.

According to another aspect of the invention, an electro-optical device substrate includes a substrate that holds an electro-optical material thereon and includes a plurality of pixels each having a reflective display region and a transmissive display region; a reflective film that is provided in the reflective display region and has a flat surface in a portion of the reflective display region adjacent to the transmissive display region, the portion of the reflective display region serving as a mirror-reflection region; and colored layers each of which is formed in only the mirror-reflection region and the transmissive display region.

Here, the 'pixel' includes a plurality of sub-pixels.

According to this structure, the electro-optical device substrate includes a substrate that holds an electro-optical material thereon and includes a plurality of pixels each having a reflective display region and a transmissive display region; a reflective film that is provided in the reflective display region and has a flat surface in a portion of the reflective display region adjacent to the transmissive display region, the portion of the reflective display region serving as a mirror-reflection region; and colored layers each of which is formed in only the mirror-reflection region and the transmissive display region. Therefore, even when the colored layer to be provided in only the transmissive display region protrudes toward the mirror-reflection region of the reflective display region due to, for example, a manufacturing error, it is possible to prevent the colored layer from protruding to the reflective display region having an uneven surface. As a result, this structure makes it possible to prevent thin reflective display, that is, thin monochromatic display, and thus to improve the quality of monochromatic display in the reflective display region, while ensuring the quality of color display by the colored layer provided in the transmissive display region. In addition, when light is incident on the mirror-reflection region, the light can be mirror-reflected therefrom without dispersion. Therefore, it is possible to prevent the colored layer protruding to only the mirror-reflection region from contributing to display.

Further, according to still another aspect of the invention, an electronic apparatus includes the above-mentioned electro-optical device.

According to this aspect, the electronic apparatus has an electro-optical device capable of improving the quality of monochromatic display in the reflective display region while ensuring the quality of color display. Thus, the electronic apparatus can have good display characteristics.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the accompanying drawings. In the following embodiments, a description will be made of an active-matrix-type transflective liquid crystal display device, which is an example of an electro-optical device, using TFDs (thin film diodes) as two-terminal switching elements and an electronic apparatus using the liquid crystal display device, but the invention is not limited thereto. In addition, in the drawings, the number and scale of components or members differ from the actual number and scale thereof in order for them to have recognizable sizes.

First Embodiment

Figure 1:
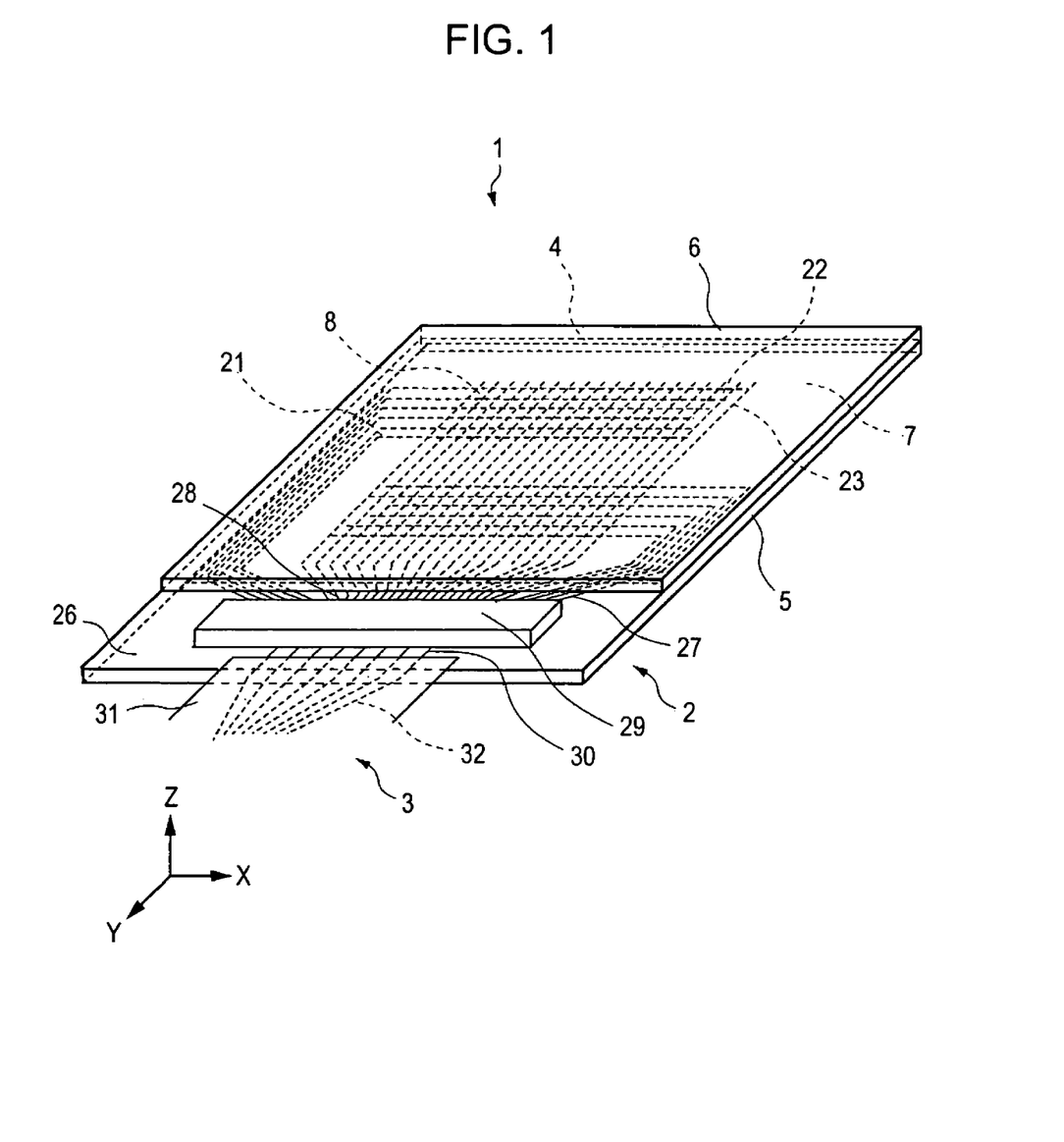
FIG. 1 is a perspective view schematically illustrating a liquid crystal display device according to a first embodiment of the invention.
Figure 2:
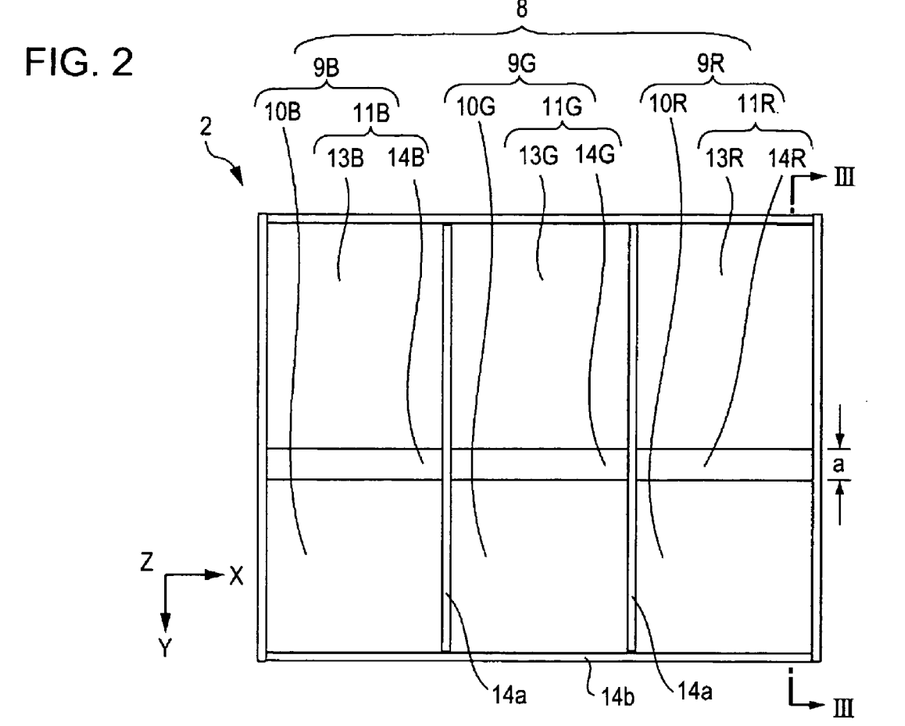
FIG. 2 is a plan view schematically illustrating a pixel of a liquid crystal panel of the liquid crystal display device shown in FIG. 1.
Figure 3:
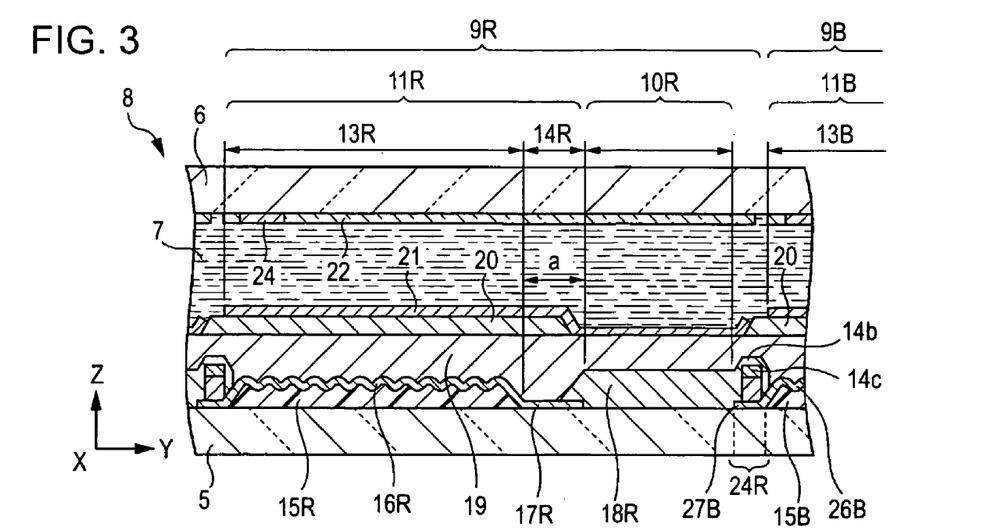
FIG. 3 is a cross-sectional view of the pixel of the liquid crystal panel, taken along the line III-III of FIG. 2.

FIG. 1 is a perspective view schematically illustrating a liquid crystal display device according to a first embodiment of the invention. FIG. 2 is a plan view schematically illustrating pixels of a liquid crystal panel of the liquid crystal display device shown in FIG. 1. FIG. 3 is a cross-sectional view of a pixel of the liquid crystal panel, taken along the line III-III of FIG. 2. In FIG. 2, a planarizing layer, scanning electrodes, and an alignment film, which will be described later, are not shown.

Structure of Liquid Crystal Display Device

As shown in FIG. 1, a liquid crystal display device 1 includes a liquid crystal panel 2 and a circuit board 3 connected to the liquid crystal panel 2. The liquid crystal display device 1 may be provided with additional units including an illuminating device (not shown), such as a backlight, if necessary.

As shown in FIG. 1, the liquid crystal panel 2 includes a pair of substrates 5 and 6 which are bonded to each other with a sealing member 4 interposed therebetween and an electro-optical material injected in a space between the substrates 5 and 6, for example, TN (twisted nematic) liquid crystal 7.

As shown in FIG. 1, a plurality of pixels 8, which are units for displaying, for example, characters, are provided on the substrate 5 in the X and Y directions. As shown in FIG. 2, each pixel 8 has rectangular sub-pixels 9R, 9G, and 9B for respectively displaying red, green, and blue, and the sub-pixels 9R, 9G, and 9B are formed in a row along the X direction, with first light shielding layers 14a interposed among the sub-pixels.

As shown in FIGS. 2 and 3, the sub-pixel 9R includes a transmissive display region 10R transmitting light emitted from a backlight (not shown) which is provided on a surface of the substrate 5 opposite to the liquid crystal 7 to perform color display and a reflective display region 11R having a reflective film, which will be described later, provided therein. The reflective display region 11R has an effective reflective display region 13R which reflects light incident on the substrate 5 from the substrate 6 to perform monochromatic display and a flat region 14R, which will be described later, other than the effective reflective display region 13R. In addition, reflective display is performed by the effective reflective display region 13R and the flat region 14R. Since light is mirror-reflected (specularly reflected) from the flat region 14R, the flat region 14R does not contribute to reflective display. A transmissive display region 10R is provided in a portion (a lower side of FIG. 2 and a right side of FIG. 3) of the sub-pixel 9R in the Y direction of FIG. 2 or 3, and the effective reflective display region 13R is provided in another portion (an upper side of FIG. 2 and a left side of FIG. 3) of the sub-pixel 9R in the Y direction of FIG. 2 or 3.

The sub-pixel 9R includes an underlayer 15R provided in the effective reflective display region 13R, a reflective film 16R which is provided in the reflective display region 11R and has a flat portion 17R provided in the flat region 14R adjacent to the transmissive display region 10R, a colored layer 18R provided at least in the transmissive display region 10R, a planarizing layer 19 for planarizing a surface of the reflective film 16R facing the liquid crystal 7, a cell thickness adjusting layer 20 for adjusting the thickness of the liquid crystal 7 in the Z direction, and a scanning electrode 21.

As shown in FIG. 3, the underlayer 15R is provided on a surface of the substrate 5 facing the liquid crystal 7 in the effective reflective display region 13R. The underlayer 15R is formed of, for example, resin. A plurality of uneven portions is provided in the underlayer 15R.

The reflective film 16R is provided in the reflective display region 11R. The reflective film 16R is formed of, for example, aluminum or an aluminum alloy. The reflective film 16R provided in the effective reflective display region 13R has an uneven shape corresponding to the uneven shape of the underlayer 15R. In this way, light incident from the substrate 6 can be scattered by the reflective film 16R to be reflected therefrom.

The flat portion 17R of the reflective film 16R extends from the reflective film 16R provided in the effective reflective display region 13R to the flat region 14R so as to be provided on the surface of the substrate 5 facing the liquid crystal 7 without the underlayer interposed therebetween in the flat region 14R. The reflective film 16R and the flat portion 17R are integrally formed of, for example, aluminum. The flat portion 17R has a surface substantially parallel to the surface of the substrate 5 facing the liquid crystal 7. A width a of the flat portion 17R in the Y direction is within a range of 1 to 10 μm, preferably, a range of 2 to 6 μm, and more preferably, 4 μm. That is, a gap between the transmissive display region 10R and the effective reflective display region 13R is within a range of 1 to 10 μm.

Further, as shown in FIG. 3, a flat portion 27B extending from a reflective film 26B provided in an effective reflective display region 13B is provided on the surface of the substrate 5 facing the liquid crystal 7 in the vicinity of a boundary between the transmissive display region 10R of the sub-pixel 9R and the effective reflective display region 13B of a sub-pixel 9B adjacent to the transmissive display region 10R.

In this embodiment, the flat portions 17R and 27B are provided on the substrate 5. Alternatively, an underlayer may be formed on the substrate 5 and the flat portions 17R and 27B may be formed on the underlayer.

As shown in FIG. 3, a red colored layer 18R is provided on the surface of the substrate 5 facing the liquid crystal 7 in the transmissive display region 10R. As shown in FIG. 3, an end of the colored layer 18R adjacent to the flat region 14R is laminated on the flat portion 17R. Alternatively, the colored layer 18R may not be formed on the flat portion 17R. However, in order to prevent a region not having the colored layer 18R therein from being formed in the transmissive display region 10R due to an error in manufacture, a portion of the colored layer 18R is formed on the flat portion 17R, considering the error in manufacture.

The planarizing layer 19 is provided on surfaces of the reflective film 16R, the flat portion 17R, and the colored layer 18R facing the liquid crystal 7. The planarizing layer 19 is formed of, for example, acrylic resin. The planarizing layer 19 has a flat surface facing the liquid crystal 7.

As shown in FIG. 3, the cell thickness adjusting layer 20 is provided on a surface of the planarizing layer 19 facing the liquid crystal 7 in the effective reflective display region 13R and the flat region 14R. The cell thickness adjusting layer 20 is formed of, for example, acrylic resin. The cell thickness adjusting layer 20 causes the thickness of the liquid crystal 7 in the Z direction in the effective reflective display region 13R to be smaller than the thickness of the liquid crystal 7 in the Z direction in the transmissive display region 10R.

The scanning electrode 21 is provided on surfaces of the cell thickness adjusting layer 20 and the planarizing layer 19 facing the liquid crystal 7 in the X direction of FIG. 3 in the transmissive display region 10R, the effective reflective display region 13R, and the flat region 14R. The scanning electrode 21 is formed of, for example, ITO (indium tin oxide).

For example, an alignment film (not shown) formed of, for example, polyimide resin is formed on the scanning electrode 21, and a polarizing plate (not shown) is provided on a surface of the substrate 5 opposite to the liquid crystal 7.

As shown in FIG. 2, the first light shielding layer 14a is formed between, for example, adjacent sub-pixels 9R and 9G by laminating colored layers. As shown in FIG. 3, a second light shielding layer 14b is provided on a surface of the flat portion 27B facing the liquid crystal 7 between the transmissive display region 10R and the effective reflective display region 13B of the sub-pixel 9B adjacent to the transmissive display region 10R. As shown in FIG. 3, the second light shielding layer 14b is formed by laminating an end portion of the colored layer 18R provided in the transmissive display region 10R, facing the effective reflective display region 13B, on another colored layer.

The sub-pixels 9G and 9B have the same structure as the sub-pixel 9R except that green and blue colored materials are used to perform green and blue display, and thus a description thereof will be omitted.

Meanwhile, as shown in FIG. 3, the substrate 6 has a plurality of pixel electrodes 22 arranged in a matrix, a plurality of signal electrodes 23 (which is shown in FIG. 1, but is not shown in FIG. 3) which extend in strip shapes so as to intersect the scanning electrodes 21 at boundary regions between the pixel electrodes 22, and TFDs 24 connected to the pixel electrodes 22 and the signal electrodes 23 on a surface thereof facing the liquid crystal 7. In addition, an alignment film (not shown) is formed on surfaces of the pixel electrodes 22 facing the liquid crystal 7. The pixel electrodes 22 are formed of a transparent conductive material, such as ITO. Similar to the substrate 5, for example, a polarizing plate (not shown) is provided on a surface of the substrate 6 opposite to the liquid crystal.

As shown in FIG. 1, the substrates 5 and 6 are plate members formed of a transmissive material, such as glass or synthetic resin. The substrate 5 has a protruding portion 26 extending from the edge of the substrate 6 (hereinafter, referred to as a 'protruding portion').

Further, as shown in FIG. 1, the protruding portion 26 is provided with scanning electrode wiring lines 27 and signal electrode wiring lines 28 composed of the scanning electrodes 21 and the scanning electrodes 23 extending from a region surrounded the sealing member 4 and a liquid crystal driving IC 29 for supplying, for example, a liquid crystal driving current to the scanning and signal electrode wiring lines 27 and 28.

Further, the protruding portion 26 is provided with a plurality of electrode terminals (not shown) provided in a mounting region of the substrate 5 corresponding to a mounting surface of the liquid crystal driving IC 29 and a plurality of input terminals (not shown) for inputting a current from the circuit board 3 to the liquid crystal driving IC 29. The electrode terminals are connected to the scanning electrode wiring lines 27 and the signal electrode wiring lines 28.

Furthermore, the protruding portion 26 includes external connection terminals (not shown) for receiving a current from the circuit board 3 and input wiring lines 30 for supplying the current from the outside to the input terminals. In addition, the signal electrodes 23 are formed of a metallic material, such as Ta, Cr, or TaW.

Moreover, as shown in FIG. 1, the circuit board 3 is constituted by forming, for example, a wiring pattern 32 on a base substrate 31.

In this structure, the base substrate 31 is a film member having flexibility, and the wiring pattern 32 is formed of, for example, copper. In addition, terminals (not shown) are formed on a side of the base substrate 31 facing the protruding portion 26 so as to be connected to the external connection terminals through, for example, ACF.

Manufacturing Method of Liquid Crystal Display Device

Next, a method of manufacturing the liquid crystal display device 1 will be described with reference to the drawings.

Figure 4:
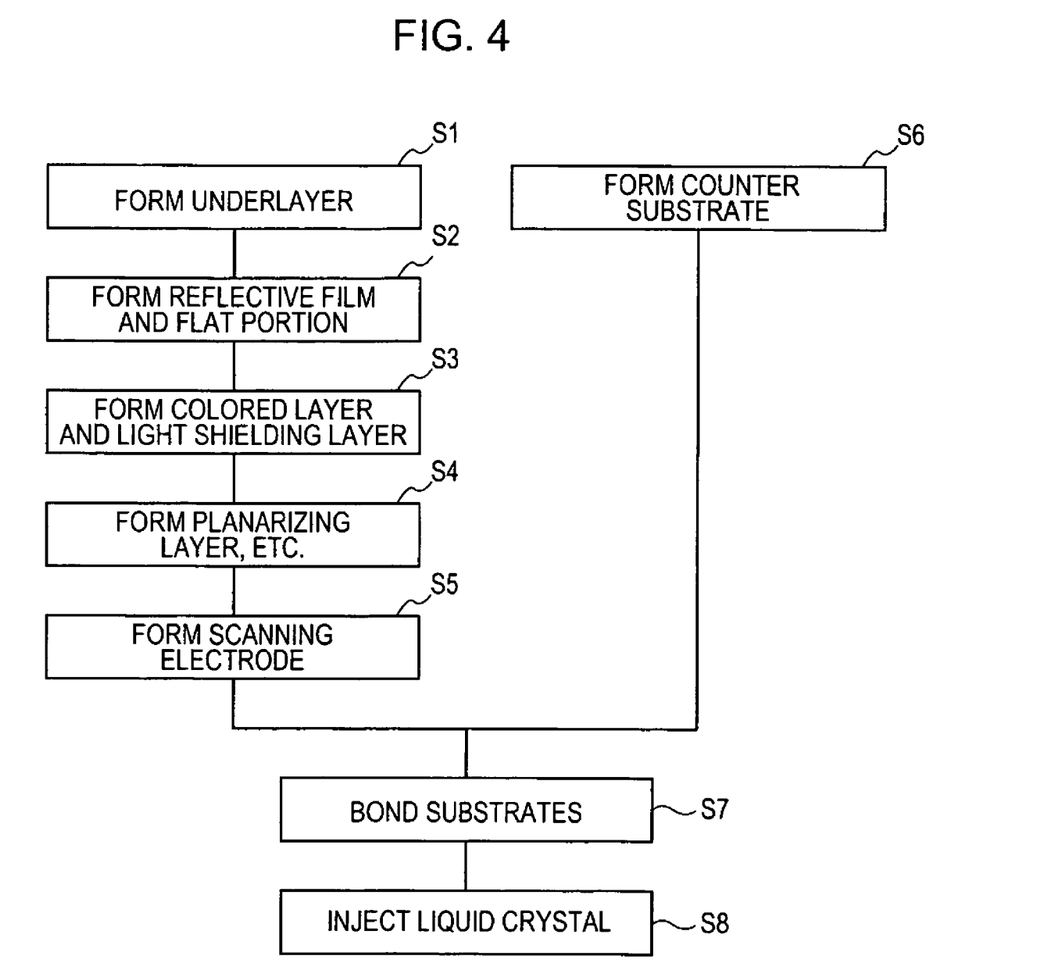
FIG. 4 is a flow chart illustrating a process for manufacturing the liquid crystal display device according to the first embodiment.

FIG. 4 is a flow chart illustrating a process of manufacturing the liquid crystal display device 1 according to the first embodiment.

First, the substrate 5 is cleaned and dried, and, for example, a positive photosensitive resin is applied onto the substrate 5 to form the underlayer 15R having an uneven pattern thereon in the effective reflective display region 13R (S1).

Successively, an aluminum film is formed with a predetermined thickness so as to cover the substrate 5 and underlayers 15R and 15B by using, for example, a sputtering method. Portions of the reflective film is removed by, for example, etching to form a plurality of apertures through which light passes, thereby forming the reflective films 16R and 26B having the flat portions 17R and 27B, respectively (S2). In this case, the flat portion 17R is integrally formed with the reflective film 16R in the flat region 14R so as to have a width a of 1 to 10 μm in the Y direction. In addition, the flat portion 27B is integrally formed with the reflective film 26B in the flat region 24R so as to have a width a of 1 to 10 μm in the Y direction.

Next, a material forming a colored layer 14c is applied in the vicinity of the boundary between the transmissive display region 10R of the sub-pixel 9R and the effective reflective display region 13B of the sub-pixel 9B adjacent to the transmissive display region 10R in the Y direction to form the second light shielding layer 14b therein, and a material forming the colored layer 18R is applied so as to overlap the colored layer 14c and the surface of the substrate 5 facing the liquid crystal 7 in the transmissive display region 10R (S3). In this case, even when the material forming the colored layer 18R flows on the flat portion 17R to protrude from the flat region 14R, there is no fear that the colored layer 18R will be provided in the effective reflective display region 13R. That is, a gap (the width a of the flat portion 17R in the Y direction) between the transmissive display region 10R and the effective reflective display region 13R is set such that the colored layer 18R is not provided in the effective reflective display region 13R. The green colored layer 18G and the blue colored layer 18B are formed, and the first and second light shielding layers 14a and 14b are formed in the same manner as described above. When the flat portion 27B is not provided, the second light shielding layer 14b may not be provided.

Then, the planarizing layer 19 is formed in the transmissive display region 10R, the effective reflective display region 13R, and the flat region 14R, and a transparent photosensitive resin is applied on a surface of the planarizing layer 19 facing the liquid crystal 7 in the effective reflective display region 13R and the flat region 14R to form the cell thickness adjusting layer 20. In this way, as shown in FIG. 3, the thickness of the liquid crystal 7 in the Z direction in the effective reflective display region 13R is smaller than the thickness of the liquid crystal 7 in the Z direction in the transmissive display region 10R.

Subsequently, a thin film made of, for example, ITO is formed on the colored layer 18R and the cell thickness adjusting layer 20 and is then patterned, thereby forming the scanning electrode 21 (S5). In addition, an alignment film (not shown) is formed so as to cover the scanning electrodes 21, and a rubbing process is performed thereon.

Meanwhile, the pixel electrodes 22, the signal electrodes 23, and the TFDs 24 are formed on the substrate 6 opposite to the substrate 5. Then, an alignment film (not shown) is formed so as to cover the pixel electrodes 22, and a rubbing process is performed thereon (S6).

Successively, the sealing member 4 is provided on the substrate 5, and the substrates 5 and 6 are bonded to each other such that the first and second light shielding layers 14a and 14b are opposite to the boundary regions between the pixel electrodes 22 formed on the substrate 6 (S7).

Then, the liquid crystal 7 is injected through an injection hole formed in the sealing member 4, and the injection hole is sealed. In addition, polarizing plates are formed on outer surfaces of the substrates 5 and 6, and the circuit board 3 is connected to the liquid crystal panel 2, thereby manufacturing the liquid crystal display device 1 (S8).

That is the end of the description of the method of manufacturing the liquid crystal display device 1.

According to this embodiment, the reflective film 16R is provided in the reflective display region 11R and has the flat portion 17R formed in the flat region 14R of the reflective display region 11R adjacent to the transmissive display region, and the colored layer 18R is formed only between the flat region 14R and the transmissive display region 10R. Therefore, even when the colored layer 18R to be provided in only the transmissive display region 10R protrudes to the flat region 14R of the reflective display region 11R due to a manufacturing error, the colored layer 18R can be provided to protrude to only the flat region 14R, but not to protrude to the uneven effective reflective display region 13R. This structure makes it possible to ensure the quality of color display by the colored layer 18R provided in the transmissive display region 10R and to prevent poor monochromatic reflective display, resulting in an improvement in the quality of monochromatic display in the reflective display region 11R.

When light is incident on the flat region 14R, the light can be mirror-reflected therefrom without dispersion, which makes it possible to prevent the colored layer 18R protruding to the flat region 14R from contributing to display.

Further, since the reflective film 16R extends to the flat region 14R, the flat portion 17R can be formed of the same material as that of the reflective film 16R in the flat region 14R at the same time when the reflective film 16R is provided in the effective reflective display region 13R. Thus, it is possible to reduce the number of manufacturing processes and manufacturing costs.

Furthermore, since the reflective film 16R provided in the effective reflective display region 13R other than the flat region 14R in the reflective display region 11R has an uneven surface, the reflective film 16R can contribute to reflective display by distributed light.

Moreover, the sub-pixel 9B is provided adjacent to the sub-pixel 9R, and the reflective film 26B has the flat portion 27B provided in the flat region 24R between the transmissive display region 10R of the sub-pixel 9R and the reflective display region 11B of the sub-pixel 9B. This structure makes it possible to prevent the colored layer 18R for performing color display from protruding to the effective reflective display region 13B through the flat region 24R and thus to improve the quality of reflective display. In addition, for example, the flat portion 17R of the reflective film 16R can be simultaneously formed with the flat portion 27B of the reflective film 26B, which results in a reduction in the number of manufacturing processes.

Further, the second light shielding layer 14b formed by laminating the colored layer 18R on a colored layer having a different color from that of the colored layer 18R is provided between the transmissive display region 10R of the sub-pixel 9R and the effective reflective display region 13B of the sub-pixel 9B adjacent to the sub-pixel 9R. Therefore, the colored layer 18R for performing color display can be used for forming the second light shielding layer 14b, which makes it possible to further reduce manufacturing costs as compared with the case in which the second light shielding layer 14b is formed of a member different from the colored layer 14b.

Furthermore, the transmissive display region 10R is provided in a portion (a lower side of FIG. 2 and a right side of FIG. 3) of the sub-pixel 9R in the Y direction of FIG. 2, and the effective reflective display region 13R is provided in the other portion (an upper side of FIG. 2 and a left side of FIG. 3) of the sub-pixel 9R in the Y direction of FIG. 2. In addition, the side of the flat region 14R facing the transmissive display region 10R has a linear shape. Therefore, it is possible to decrease the length of the side of the flat region 14R facing the transmissive display region 10R as compared with the case in which the flat region is provided in a curved line and thus to reduce the area of the flat region 14R. As a result, it is possible to prevent a reduction in the brightness of reflective display and to improve the quality of monochromatic display in the effective reflective display region 13R.

Moreover, the width a (the width a of the flat portion 17R in the Y direction) of the flat region 14R is within a range of 1 to 10 μm, which makes it possible to reliably prevent the colored layer from protruding to the effective reflective display region 13R through the flat region 14R and thus to prevent reflective display from being excessively dark by the flat region 14R.

Further, the uneven underlayer 15R is provided in the reflective display region 11R except the flat region 14R to give a scattering function to the reflective film 16R. This structure makes it possible to allow scattered light to contribute to reflective display and to form the flat portion 17R not contributing to reflective display in the flat region 14R, corresponding to a region where the underlayer 15R is not formed. In this structure, since the flat region 14R is a mirror-reflective region, poor reflective color display does not occur therein even when the colored layer 18R protrudes toward the flat region 14R.

Further, the underlayer 15R is provided between the substrate 5 and the reflective film 16R in the effective reflective display region 13R, but is not provided in the flat region 14R, and the flat portion 17R is provided on the substrate 5 without the underlayer 15R interposed therebetween. Therefore, the flat portion 17R can be formed in the region where the underlayer 15R is not formed. In addition, since the flat surface of the substrate 5 is used to provide the flat portion 17R, the flat portion 17R can be more reliably provided.

Furthermore, in the first embodiment, for example, the reflective film 16R and the colored layer 18R may be provided on different substrates. In this case, the reflective film 16R provided in the effective reflective display region 13R and the flat region 14R partially overlaps the colored layer 18R provided in a portion of the flat region 14R and the transmissive display region 10R in the flat region 14R.

Second Embodiment

Next, a liquid crystal display device according to a second embodiment of the invention will be described. In the second embodiment, a description will be made of an active-matrix-type transflective liquid crystal display device using TFTs (thin film transistors) as three-terminal switching elements.

In addition, in other embodiments and modifications of the second embodiment, the same components as those in the second embodiment have the same reference numerals, and a description thereof will be omitted. Therefore, a description will be made centered on different components.

Figure 5:
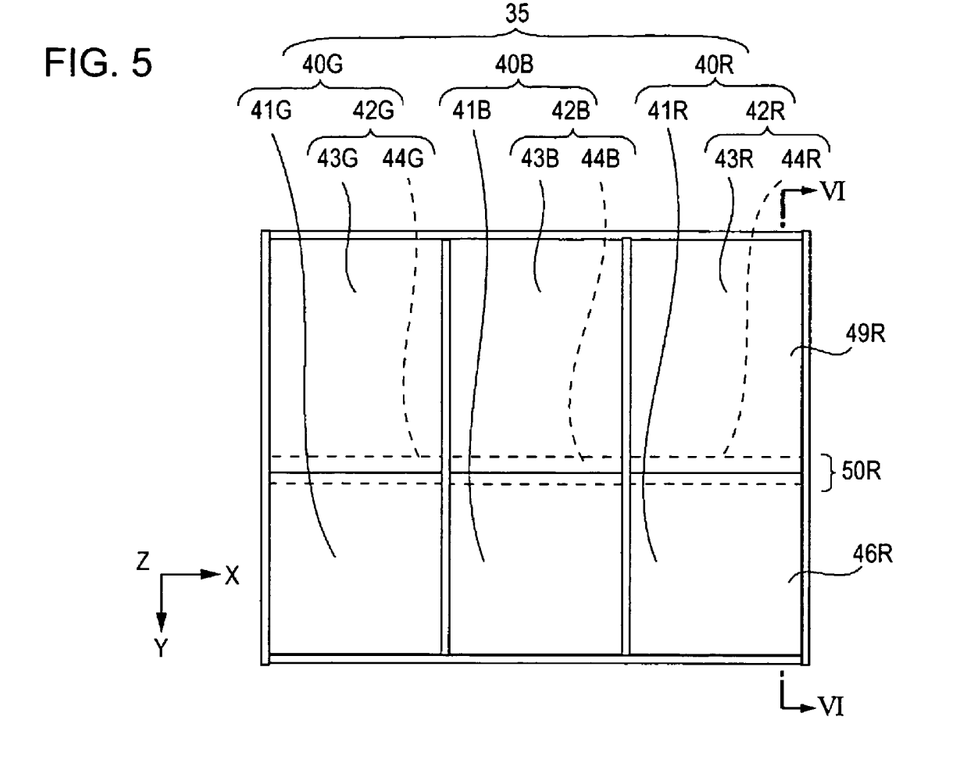
FIG. 5 is a plan view schematically illustrating a pixel of a liquid crystal panel of a liquid crystal display device according to a second embodiment of the invention.
Figure 6:
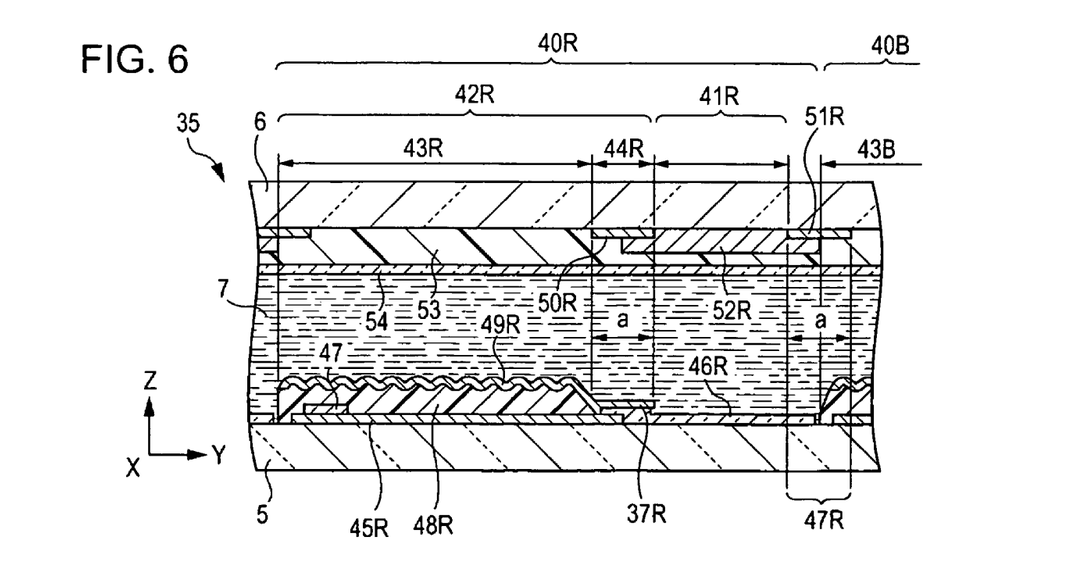
FIG. 6 is a cross-sectional view of the pixel of the liquid crystal panel, taken along the line VI-VI of FIG. 5.

FIG. 5 is a plan view schematically illustrating pixels of a liquid crystal panel of the liquid crystal display device according to the second embodiment. FIG. 6 is a cross-sectional view of a pixel of the liquid crystal panel, taken along the line VI-VI of FIG. 5.

In the first embodiment, the reflective film 16R provided in the reflective display region 11R has the flat portion 17R in the flat region 14R, and is provided on the surface of the substrate 5 facing the liquid crystal 7. However, in this embodiment, as shown in FIG. 6, a reflective film 49R, which will be described later, is provided on a surface of the substrate 5 facing the liquid crystal 7, and a light shielding portion 50R is provided on a surface of the substrate 6 facing the liquid crystal 7, corresponding to a flat portion 37R of the reflective film 49R.

A plurality of pixels 35, which are units for displaying, for example, characters, are provided on the substrate 5 in the X and Y directions. As shown in FIG. 5, each pixel 35 has three rectangular sub-pixels 40R, 40G, and 40B for respectively displaying red, green, and blue, and the sub-pixels 40R, 40G, and 40B are formed in a row along the X direction, with first light shielding layers 14a interposed among the sub-pixels.

A transmissive display region 41R is provided in a portion (a lower side of FIG. 5 and a right side of FIG. 6) of the sub-pixel 40R in the Y direction of FIG. 5, and a reflective display region 42R having a reflective film, which will be described later, formed therein is provided in another portion (an upper side of FIG. 5 and a left side of FIG. 6) of the sub-pixel 40R in the Y direction of FIG. 5. The reflective display region 42R includes an effective reflective display region 43R for reflecting light incident on the substrate 5 from the substrate 6 to perform monochromatic display and a light shielding region 44R (which will be described later), which is a portion of the reflective display region 42R other than the effective reflective display region 43R.

Meanwhile, the substrate 5 has contact electrodes 45R each provided in the effective reflective display region 43R and a portion of the light shielding region 44R to electrically connect the reflective film 49R, a transparent electrode 46R, and a TFT 47, the transparent electrodes 46R each provided in the transmissive display region 41R and a portion of the light shielding region 44R, TFTs 47 each electrically connected to the contact electrode 45R, an underlayer 48R provided on a surface of the substrate 5 facing the liquid crystal 7 in the effective reflective display region 43R, and the reflective film 49R which is formed on the underlayer 48R and has the flat portion 37R provided in the light shielding region 44R provided thereon. The substrate 6 has the light shielding portions 50R provided on a surface thereof facing the liquid crystal 7 in the light shielding region 44R, light shielding portions 51R, which will be described later, colored layers 52R provided on the surface thereof facing the liquid crystal 7 in at least the transmissive display region 41R, a planarizing layer 53, and a common electrode 54 provided thereon, which will be described later.

As shown in FIG. 6, the contact electrode 45R is provided on the surface of the substrate 5 facing the liquid crystal 7 in the effective reflective display region 43R and a portion of the light shielding region 44R. An end portion of the contact electrode 45R is provided in the light shielding region 44R. The contact electrode 45R is formed of a metallic material, such as chrome.

As shown in FIG. 6, the transparent electrode 46R is provided on the surface of the substrate 5 facing the liquid crystal 7 in the effective reflective display region 41R and a portion of the light shielding region 44R. As shown in FIG. 6, an end portion of the transparent electrode 46R is laminated on the end portion of the contact electrode 45R in the light shielding region 44R. The transparent electrode 46R is formed of, for example, ITO.

Each TFT 47 includes gate and source electrodes (not shown) and is electrically connected to the contact electrode 45R.

The underlayer 48R is provided on the surface of the substrate 5 facing the liquid crystal 7 so as to be laid across the effective reflective display region 43R and a portion of the light shielding region 44R. A plurality of uneven portions is provided in the underlayer 48R.

The reflective film 49R is formed on a surface of the underlayer 48R facing the liquid crystal 7. The reflective film 49R is formed of, for example, aluminum or an aluminum alloy. The reflective film 49R has an uneven shape corresponding to the uneven shape of the underlayer 48R. An end portion of the reflective film 49R in the light shielding region 44R is electrically connected to a connecting portion between the contact electrode 45R and the transparent electrode 46R and constitutes the flat portion 37R serving as a reflective electrode.

Further, an alignment film (not shown) is provided on surfaces of the reflective film 49R and the transparent electrode 46R facing the liquid crystal 7. In addition, for example, a polarizing plate (not shown) is provided on a surface of the substrate 5 opposite to the liquid crystal 7. The sub-pixels 40G and 40B have the same structure as the sub-pixel 40R has except that green and blue colored materials are used to perform green and blue display, and thus a description thereof will be omitted.

Meanwhile, the light shielding portion 50R is provided on the surface of the substrate 6 facing the liquid crystal 7 in the light shielding region 44R without the underlayer interposed therebetween. The light shielding portion 50R has a surface substantially parallel to the surface of the substrate 6 facing the liquid crystal 7. A width a of the light shielding portion 50R in the Y direction is within a range of 1 to 10 μm. The light shielding portion 50R is formed of a metallic material, such as aluminum.

The light shielding portion 51R is provided on the surface of the substrate 6 facing the liquid crystal 7 in the vicinity of a boundary between the transmissive display region 41R of the sub-pixel 40R and the effective reflective display region 43B of the sub-pixel 40B adjacent to the transmissive display region 41R in the Y direction. The width a of the light shielding portion 51R in the Y direction is within a range of 1 to 10 μm. The light shielding portion 51R is formed of a metallic material, such as aluminum. For example, the width of the transmissive display region 41R is determined by the light shielding portions 50R and 51R.

The red colored layer 52R is provided in at least the transmissive display region 41R on the surface of the substrate 6 facing the liquid crystal 7. Both ends of the colored layer 52R in the Y direction are laminated on portions of the light shielding portions 50R and 51R. Alternatively, the colored layer 52R may be formed so as not to be laminated on the light shielding portions 50R and 51R. However, in order to prevent a region not having the colored layer 52R therein from being formed in the transmissive display region 41R due to an error in manufacture, a portion of the colored layer 52R is formed on the light shielding portion 50R, considering the error in manufacture.

The planarizing layer 53 is provided on surfaces of the substrate 6, the light shielding portion 50R, and the colored layer 52R facing the liquid crystal 7. The planarizing layer 53 has a flat surface facing the liquid crystal 7. The planarizing layer 53 is formed of, for example, acrylic resin.

The common electrode 54 is provided on a surface of the planarizing layer 53 facing the liquid crystal 7. The common electrode 54 is formed of a transparent conductive material, such as ITO. In addition, an alignment film (not shown) is provided on a surface of the common electrode 54 facing the liquid crystal 7. Similar to the substrate 5, for example, a polarizing plate (not shown) is provided on the surface of the substrate 6 opposite to the liquid crystal 7.

According to this embodiment, the reflective film 49R and the flat portion 37R are provided on the surface of the substrate 5 facing the liquid crystal 7, and the light shielding portion 50R is provided on the surface of the substrate 6 facing the liquid crystal 7 so as to correspond to the flat portion 37R. Therefore, even when the colored layer 52R to be provided in the transmissive display region 41R protrudes toward the light shielding region 44R due to a manufacturing error, the colored layer 52R does not protrude to the effective reflective display region 43R, and is hidden by the light shielding portion 50R, as viewed from the light transmission side, which makes it possible to improve the quality of monochromatic display in the reflective display region 43R.

Further, a light shielding portion 51R capable of shielding light is provided in the vicinity of a boundary between the transmissive display region 41R of the sub-pixel 40R and the effective reflective display region 43B of the sub-pixel 40B adjacent to the transmissive display region 41R. The light shielding portions 50R and 51R can be formed at the same time between the transmissive display region 41R and the effective reflective display region 43R and in the vicinity of the boundary between the transmissive display region 41R of the sub-pixel 40R and the effective reflective display region 43B of the sub-pixel 40B, respectively. As a result, it is possible to further reduce the number of manufacturing processes as compared with the case in which a process for forming the light shielding portion 51R is separately performed with a process for forming the light shielding portion 50R in the light shielding region 44R.

First Modification

Figure 7:
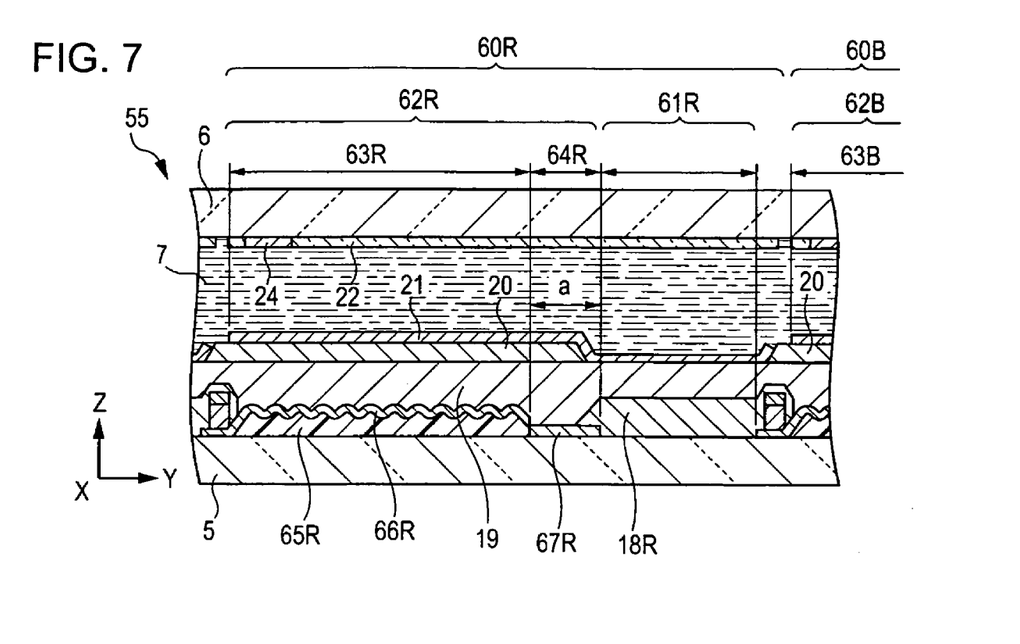
FIG. 7 is a cross-sectional view of a pixel of a liquid crystal panel of a liquid crystal display device according to a first modification.

FIG. 7 is a cross-sectional view of a pixel of a liquid crystal panel of a liquid crystal display device according to a first modification.

In the first embodiment, the flat portion 17R is provided on the surface of the substrate 5 facing the liquid crystal 7 so as to extend from the reflective film 16R provided in the effective reflective display region 13R to the flat region 14R. However, in this modification, a flat portion 67R, which will be described later, is formed of a different material from a reflective film 66R provided in an effective reflective display region 63R on a surface of the substrate 5 facing the liquid crystal 7.

A plurality of pixels 55, which are units for displaying, for example, characters, are provided on the substrate 5 in the X and Y directions. Each pixel 55 has three rectangular sub-pixels 60R, 60G, and 60B for respectively displaying red, green, and blue, and the sub-pixels 60R, 60G, and 60B are formed in a row along the X direction, with first light shielding layers 14a interposed among the sub-pixels.

As shown in FIG. 7, the sub-pixel 60R has a rectangular transmissive display region 61R transmitting light emitted from a backlight (not shown) which is provided on a surface of the substrate 5 opposite to the liquid crystal 7 to perform color display and a reflective display region 62R, which will be described later, provided therein. The reflective display region 62R has an effective reflective display region 63R which reflects light incident on the substrate 5 from the substrate 6 to perform monochromatic display and a flat region 64R other than the effective reflective display region 63R.

The sub-pixel 60R includes an underlayer 65R provided in the effective reflective display region 63R, a reflective film 66R formed on the underlayer 65R, a flat portion 67R provided in the flat region 64R, a colored layer 18R provided in at least the transmissive display region 61R, a planarizing layer 19 for planarizing a surface of the reflective film 66R facing the liquid crystal 7, a cell thickness adjusting layer 20 for adjusting the thickness of the liquid crystal 7 in the Z direction, and a scanning electrode 21.

As shown in FIG. 7, the underlayer 65R is provided on a surface of the substrate 5 facing the liquid crystal 7 in the effective reflective display region 63R, but is not provided in the flat region 64R. The underlayer 65R is formed of, for example, resin. A plurality of uneven portions is provided in the underlayer 65R.

The reflective film 66R is formed on a surface of the underlayer 65R facing the liquid crystal 7, but is not provided in the flat region 64R. The reflective film 66R is formed of, for example, aluminum or an aluminum alloy. The reflective film 66R has an uneven shape corresponding to the uneven shape of the underlayer 65R. In this way, light incident from the substrate 6 can be scattered by the reflective film 66R to be reflected therefrom.

The flat portion 67R is formed of, for example, a metallic material different from that forming the reflective film 66R provided in the effective reflective display region 63R on the surface of the substrate 5 facing the liquid crystal 7. The flat portion 67R is provided on the surface of the substrate 5 facing the liquid crystal 7 without the underlayer 65R interposed therebetween in the flat region 64R. The flat portion 67R is formed of, for example, aluminum. The flat portion 67R has a surface substantially parallel to the surface of the substrate 5 facing the liquid crystal 7. A width a of the flat portion 67R in the Y direction is within a range of 1 to 10 μm.

As shown in FIG. 7, a red colored layer 18R is provided in at least the transmissive display region 61R on the surface of the substrate 5 facing the liquid crystal 7. As shown in FIG. 7, an end of the colored layer 18R adjacent to the flat region 64R is laminated on the flat portion 67R. In this modification, the end of the colored layer 18R is formed on the flat portion 67R, but the colored layer 18R may not be formed on the flat portion 67R. However, in order to prevent a region not having the colored layer 18R therein from being formed in the transmissive display region 61R due to an error in manufacture, a portion of the colored layer 18R is formed on the flat portion 67R, considering the error in manufacture.

The planarizing layer 19 is provided on surfaces of the reflective film 66R, the flat portion 67R, and the colored layer 18R facing the liquid crystal 7. The planarizing layer 19 is formed of, for example, acrylic resin. The planarizing layer 19 has a flat surface facing the liquid crystal 7.

In this modification, for example, the cell thickness adjusting layer 20 and the scanning electrode 21 have the same structure as those in the first embodiment, and thus a description thereof will be omitted. In addition, the sub-pixels 60G and 60B have the same structure as that of the sub-pixel 60R except that green and blue colored materials are used to perform green and blue display, and thus a description thereof will be omitted. Further, the substrate 6 has the same structure as that in the first embodiment, and a description thereof will be omitted.

According to this modification, the flat portion 67R is formed of a metallic material different from that forming the reflective film 66R provided on the surface of the substrate 5 in the effective reflective display region 63R. Therefore, the flat portion 67R can be simultaneously formed with metal wiring lines, and thus a liquid crystal display device can be manufactured without an increase in manufacturing costs. In addition, the reflective film 66R of the effective reflective display region 63R can be formed of, for example, a metallic material, and the flat portion 67R can be formed of a material (for example, white pigment) other than the metallic material.

Figure 8:
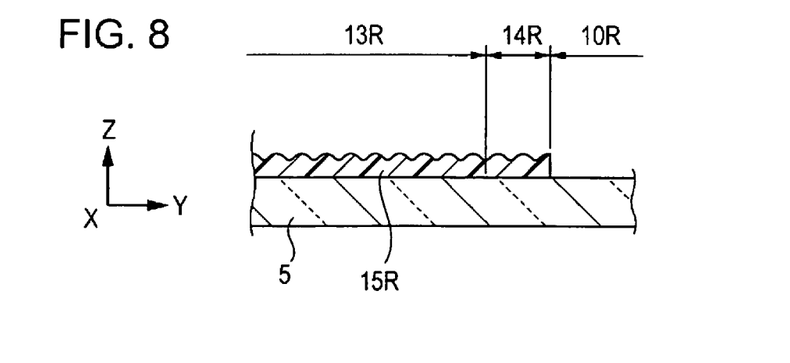
FIG. 8 is a cross-sectional view illustrating a process for forming an underlayer of the liquid crystal display device.
Figure 9:
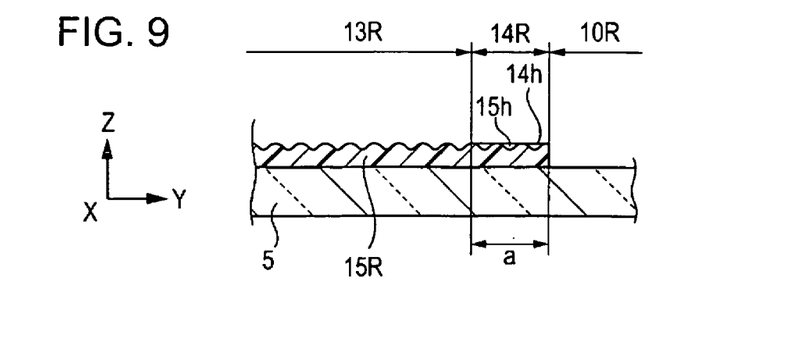
FIG. 9 is a cross-sectional view illustrating a process for forming a flat surface on the underlayer of the liquid crystal display device.
Figure 10:
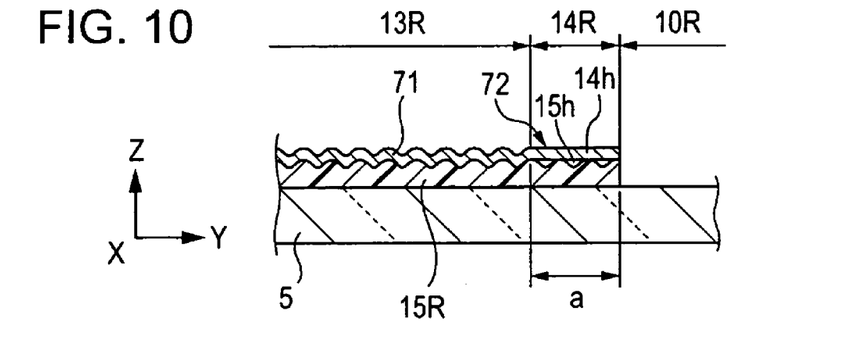
FIG. 10 is a cross-sectional view illustrating a process for forming a flat portion of the liquid crystal display device.

In the first embodiment, the flat portion 17R is provided on the surface of the substrate 5 facing the liquid crystal 7 so as to extend from the reflective film 16R provided in the effective reflective display region 13R to the flat region 14R. However, alternatively, as shown in FIG. 8, the underlayer 15R having unevenness on a surface thereof is formed in the effective reflective display region 13R and flat region 14R on the surface of the substrate 5 facing the liquid crystal 7, and a planarizing film 15h made of the same resin material as that forming the underlayer 15R is formed on the uneven underlayer 15R in the flat region 14R to planarize the uneven surface, so that a flat surface 14h is formed in the flat region 14R by the planarizing film 15h made of resin, as shown in FIG. 9. Subsequently, as shown in FIG. 10, a reflective film 71 and a flat portion 72 are simultaneously formed in the effective reflective display region 13R and the flat region 14R. This structure makes it possible to form the flat portion 72 even when it is difficult to selectively form uneven portions in the effective reflective display region 13R except the flat region 14R.

Figure 11:
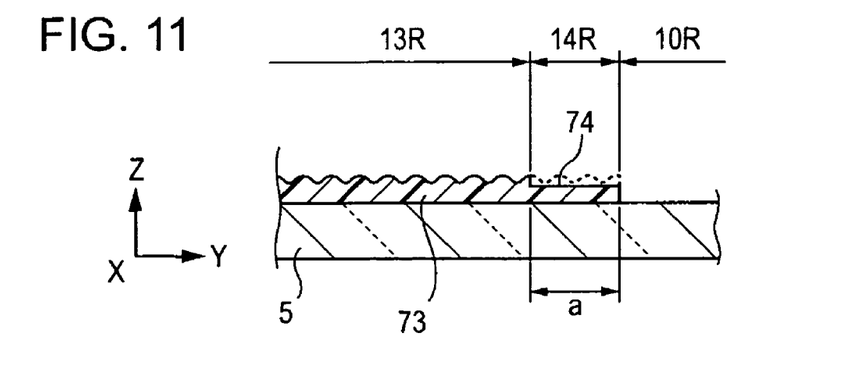
FIG. 11 is a cross-sectional view illustrating another process for forming the flat surface on the underlayer of the liquid crystal display device.
Figure 12:
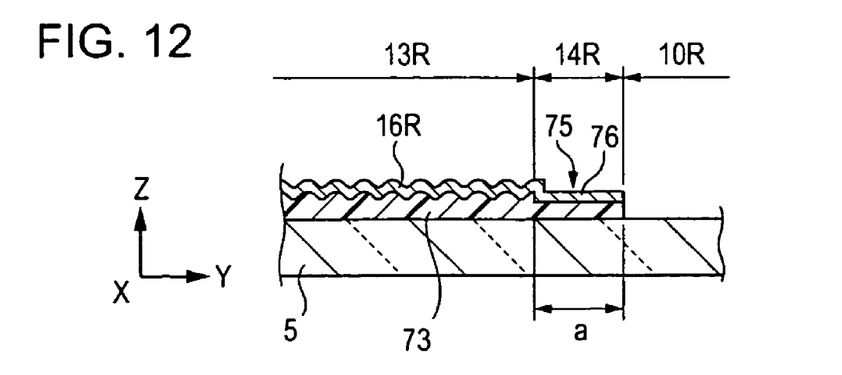
FIG. 12 is a cross-sectional view illustrating another process for forming the flat portion of the liquid crystal display device.

Further, in the first embodiment, the underlayer 15R is provided in the effective reflective display region 13R, but is not provided in the flat region 14R. Alternatively, the following structure may be used. As shown in FIG. 11, an underlayer 73 having unevenness on a surface thereof is provided in the effective reflective display region 13R and the flat region 14R, and convex portions protruding to the liquid crystal 7 in the flat region are removed by, for example, a photolithography technique to form a flat surface 74. Then, as shown in FIG. 12, an aluminum layer is formed in the effective reflective display region 13R and the flat region 14R. In this way, a reflective film 16R is formed in the effective reflective display region 13R, and a flat portion composed of a flat film 76 extending from the reflective film 16R and the underlayer 73 is formed in the flat region 14R. In this case, the underlayer 73 is provided between the substrate 5 and the reflective film 16R in the effective reflective display region 13R, and is provided between the substrate 5 and the flat film 76 in the flat region 14R. Therefore, it is possible to reduce the amount of a colored layer forming material flowing into the flat region 14R from the transmissive display region 10R at the time of manufacture as compared with the first embodiment in which the height from the surface of the substrate 5 facing the liquid crystal 7 to the flat portion 17R is small, which makes it possible to more reliably prevent a colored layer from protruding toward the effective reflective display region 13R via the flat region 14R and thus to more improve the quality of monochromatic display in the effective reflective display region 13R.

Alternatively, the flat surface 74 may be formed by forming no uneven portions on the surface of the underlayer 73 facing the liquid crystal 7 in the flat region at the beginning, instead of removing the convex portions of the underlayer 73 protruding toward the liquid crystal 7 in the flat region 14R.

Further, in the first embodiment, the side of the flat region 14R adjacent to the transmissive display region 10R has a linear shape, but the forming positions of the transmissive display region and the flat region in a sub-pixel are not limited thereto. For example, the transmissive display region may be formed in an island shape in the reflective display region, and the flat region may be provided between the reflective display region and the transmissive display region. In addition, the reflective display region may be formed in an island shape in the transmissive display region, and the flat region may be provided between the reflective display region and the transmissive display region. In these cases, it is possible to prevent the deterioration of display quality depending on the deviation of the forming positions of the transmissive display region and the reflective display region.

More specifically, the following structures can be considered: a structure in which a reflective film is provided in an island shape in a sub-pixel, regions where the reflective film is provided are used as an effective reflective display region and a flat region, and a transmissive display region is provided so as to surround the island-shaped reflective film; and a structure in which apertures are formed in a reflective film, the apertures are used as transmissive display regions, and effective reflective display regions and flat regions are provided so as to surround the apertures.

Third Embodiment/Electronic Apparatus

Next, an electronic apparatus according to a third embodiment of the invention, having the above-mentioned liquid crystal display device 1 therein, will be described.

Figure 13:
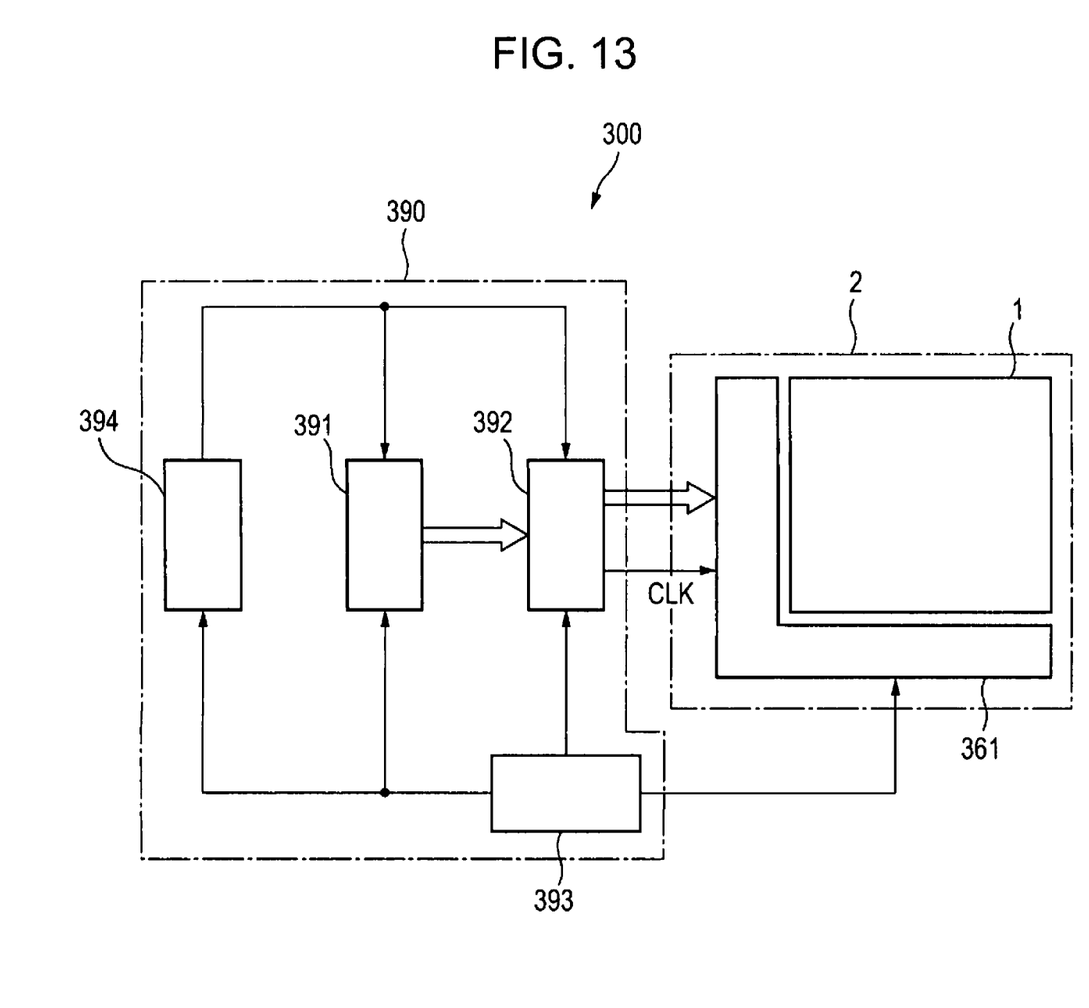
FIG. 13 is a block diagram schematically illustrating a display control system of an electronic apparatus according to a third embodiment of the invention.

FIG. 13 is a block diagram schematically illustrating the overall structure of a display control system of the electronic apparatus according to the third embodiment of the invention.

As shown in FIG. 13, an electronic apparatus 300 includes, as a display control system, the liquid crystal panel 2 and a display control unit 390. The display control unit 390 includes a display information output source 391, a display information processing circuit 392, a power supply circuit 393, and a timing generator 394.

The liquid crystal panel 2 has a driving circuit 361 including the liquid crystal driving IC 29 for driving a display region I.

The display information output source 391 has a memory composed of a ROM (read only memory) or a RAM (random access memory), a storage unit composed of, for example, a magnetic recording disk or an optical recording disk, and a tuning circuit for tuning and outputting digital image signals. The display information output source 391 supplies display information to the display information processing circuit 392 in the form of image signals having a predetermined format, on the basis of various clock signals generated by the timing generator 394.

The display information processing circuit 392 includes various well-known circuits, such as a serial-parallel conversion circuit, an amplification/inversion circuit, a rotation circuit, a gamma correction circuit, and a clamp circuit. The display information processing circuit 392 processes input display information to supply the processed image information to the driving circuit 361 together with a clock signal CLK. The power supply circuit 393 supplies a predetermined voltage to the above-mentioned components.

According to this embodiment, since the electronic apparatus has the liquid crystal display device 1 capable of improving the quality of monochromatic display in the effective reflective display region 13R while ensuring the quality of monochromatic display in the transmissive display region 10R, it can have good display characteristic.

The invention can be applied to various electronic apparatuses, such as a cellular phone, a personal computer, a digital still camera, a touch panel, a projector, a liquid crystal television, a view-finder-type/monitor-direct-view-type videotape recorder, a car navigation apparatus, a pager, an electronic organizer, an electronic calculator, a word processor, a workstation, a television phone, and a POS terminal which are equipped with the liquid crystal display devices. It goes without saying that the above-mentioned liquid crystal display device 1 can be applied to display units of these electronic apparatuses.

Further, the electronic apparatus of the invention is not limited to the above-described examples, but various modifications and changes of the invention can be made without departing from the scope and spirit of the invention. In addition, combinations of the above-described embodiments can be made without departing from the scope and spirit of the invention.

For example, in the above-described embodiments, the liquid crystal display device 1 using TFDs and the liquid crystal display device using TFTs are used, but the invention is not limited thereto. For example, the invention may be applied to a passive matrix liquid crystal display device. In addition, the invention may be applied to various electro-optical devices, such as an electrophoresis display device, and electronic apparatuses including touch panels.

What is claimed is:

1. An electro-optical device comprising:
a pair of substrates that hold an electro-optical material therebetween and include a pixel having a reflective display region and a transmissive display region;
a reflective film provided in the reflective display region, the reflective film having:
a first mirror-reflection region that has a flat surface in a portion of the reflective display region adjacent to the transmissive display region;
a scatter-reflection region that has an uneven surface other then where the flat surface is located; and
a colored layer disposed in the first mirror-reflection region and the transmissive display region in the pixel without overlapping the uneven surface of the scatter-reflection region,
wherein the reflective film provided in the first mirror-reflection region is formed of a different material from that forming the reflective film provided in the scatter-reflection region; and
the reflective film of the first mirror-reflection region consists of a metallic material and the reflective film of the scatter-reflection region consists of a metallic material different from that of the first mirror-reflection region.

2. The electro-optical device according to claim 1, further comprising another pixel provided adjacent to the pixel;
wherein the reflective film has a second mirror-reflection region that has a flat surface, the second mirror-reflection region being located in the pixel near the transmissive display region of the other pixel.

3. The electro-optical device according to claim 1, further comprising:
another pixel provided adjacent to the pixel; and
a first light shielding layer provided between the transmissive display region of the pixel and a reflective display region of the other pixel, the reflective display region of the other pixel being adjacent to the transmissive display region of the pixel.

4. The electro-optical device according to claim 3, wherein the colored layer includes a plurality of colored layers having a plurality of colors, and
the first light shielding layer is formed by laminating the plurality of colored layers having different ones of the plurality of colors.

5. The electro-optical device according to claim 1, wherein the reflective film is provided on one of the pair of substrates, and
a light shielding layer is provided in a region of the other substrate of the pair of substrates corresponding to the first mirror-reflection region.

6. The electro-optical device according to claim 1, wherein a side of the first mirror-reflection region adjacent to the transmissive display region has a linear shape.

7. The electro-optical device according to claim 1, wherein the reflective film is provided in an island shape in the pixel, or the transmissive display region is an aperture provided in the reflective film.

8. The electro-optical device according to claim 1, wherein the first mirror-reflection region has a width of about 1 to 10 μm.

9. The electro-optical device according to claim 1, further comprising:
an underlayer that has an uneven surface and is formed between one of the substrates and the reflective film in the scatter-reflection region.

10. Electro-optical device according to claim 1, wherein an underlayer is provided between one of the substrates and the reflective film, and
the underlayer has a flat surface in the first mirror-reflection region and an uneven surface in the scatter-reflection region.

11. The electro-optical device according to claim 1, wherein an underlayer having an uneven surface is provided between one of the substrates and the reflective film, and
a planarizing film for planarizing the uneven surface of the underlayer is formed in the first mirror-reflection region between the underlayer and the reflective film.

12. An electro-optical device comprising:
a pair of substrates that hold an electro-optical material therebetween and include a pixel having a reflective display region and a transmissive display region;
a reflective film provided in the reflective display region, the reflective film having:
a first mirror-reflection region that has a flat surface in a portion of the reflective display region adjacent to the transmissive display region;
a scatter-reflection region that has an uneven surface other than where the flat surface is located; and
a colored layer disposed in the first mirror-reflection region and the transmissive display region in the pixel without overlapping the uneven surface of the scatter-reflection region,
wherein the reflective film provided in the first mirror-reflection region consists of a first material and the scatter-reflection region consists of a second material, the first material being different from the second material; and
the reflective film of the first mirror-reflection region consists of a metallic material and the reflective film of the scatter-reflection region consists of a metallic material different from that of the first mirror-reflection region.

* * * * *